United States Patent
Corlett

(10) Patent No.: US 8,819,802 B2
(45) Date of Patent: Aug. 26, 2014

(54) USER AUTHENTICATION

(75) Inventor: Douglas D. Corlett, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 59 days.

(21) Appl. No.: 13/443,130

(22) Filed: Apr. 10, 2012

(65) Prior Publication Data

US 2013/0268768 A1 Oct. 10, 2013

(51) Int. Cl.
*G06F 7/04* (2006.01)
*H04L 29/06* (2006.01)
*H04L 9/32* (2006.01)
*G06F 11/30* (2006.01)

(52) U.S. Cl.
USPC ...... 726/9; 726/20; 726/26; 726/27; 713/161; 713/164; 713/172; 713/182

(58) Field of Classification Search
USPC ........ 713/185, 161, 164, 172, 182; 726/9, 20, 726/26, 27
See application file for complete search history.

(56) References Cited

U.S. PATENT DOCUMENTS

| | | | |
|---|---|---|---|
| 3,790,758 A | 2/1974 | Tanigawa et al. | |
| 5,004,897 A | 4/1991 | Biggio et al. | |
| 5,266,783 A | 11/1993 | McAllister | |
| 5,677,521 A | 10/1997 | Garrou | |
| 6,990,588 B1 * | 1/2006 | Yasukura | 713/186 |
| 7,971,238 B2 * | 6/2011 | Pan et al. | 726/9 |
| 2002/0079373 A1 * | 6/2002 | Oki et al. | 235/475 |
| 2006/0018467 A1 * | 1/2006 | Steinmetz | 380/54 |

OTHER PUBLICATIONS

Certificate Enumeration, published Feb. 18, 2010 (updated Jun. 15, 2011), Microsoft—TechNet, retrieved from the Internet: http://technet.microsoft.com/en-us/library/92aea8c5-c617-4a04 . . . on Feb. 20, 2012, (14 pgs).
Derek Adam, Enterprise Smart Card Deployment in the Microsoft® Windows® Smart Card Framework, Microsoft Corporation, Jun. 2006, (26 pgs).
Extended European Search Report for Application No. EP13154901, mailed Aug. 7, 2013, 4 pages.

* cited by examiner

*Primary Examiner* — Mohammad W Reza
(74) *Attorney, Agent, or Firm* — Toler Law Group, PC

(57) ABSTRACT

A method includes receiving user input including a user password while an authentication token is retained at a first position in an authentication token receiver of an authentication token reader by an insertion force applied to the authentication token by a user. The authentication token reader includes a bias member that applies an ejection force to the authentication token while the authentication token is at the first position. The method also includes reading authentication data from a memory of the authentication token while the authentication token is retained at the first position by the insertion force applied to the authentication token by the user. The method also includes authenticating the user based on the authentication data.

20 Claims, 6 Drawing Sheets

USER AUTHENTICATION

FIELD OF THE DISCLOSURE

The present disclosure is generally related to user authentication.

BACKGROUND

Controlling access to computer resources is a frequent concern of network administrators. Access control systems should be reliable and should be easy for users to use. For a particular access control system, such as a multi-factor authentication system, a user may be required to provide an authentication token to gain access to resources of a computer system. Since the user may move from one computer to another, the authentication token may transfer malicious code from one computer to another if the malicious code is inadvertently uploaded to the authentication token.

SUMMARY

In particular embodiments disclosed herein, resources of a computing device are made available to an authenticated user. The user may have an authentication token (such as a fob or access card) that stores authentication data. The authentication data may be accessible when a user inserts the authentication token into an authentication token reader to an operative position and holds the authentication token in the operative position during an authentication process, e.g., while entering a user password and while the authentication data is read from the authentication token. The authentication token may be automatically ejected by the authentication token reader (to a non-operative position) when the user releases the authentication token. Thus, the authentication token and the authentication data are protected from malicious access after the authentication process is complete.

In a particular embodiment, a method includes receiving user input including a user password while an authentication token is retained at a first position in an authentication token receiver of an authentication token reader. The authentication token is retained by an insertion force applied to the authentication token by the user. The authentication token reader includes a bias member that applies an ejection force to the authentication token while the authentication token is at the first position. The method also includes reading authentication data from a memory of the authentication token while the authentication token is retained at the first position by the insertion force applied to the authentication token by the user. The method also includes authenticating the user based on the authentication data.

In another embodiment, a method includes detecting insertion of an authentication token to a first position in an authentication token receiver of an authentication token reader, where the authentication token reader includes a bias member that applies an ejection force to the authentication token while the authentication token is at the first position. The method also includes, in response to detecting the insertion of the authentication token and while the authentication token is retained at the first position by an insertion force applied by a user, prompting the user to input a user password. The method further includes, while the authentication token is retained at the first position by the insertion force applied by the user, receiving user input including the user password. The method also includes, while the authentication token is retained at the first position by the insertion force applied by the user, reading authentication data from a memory of the authentication token. The method further includes determining whether the user is authenticated based on the authentication data.

In another embodiment, a system includes an authentication token receiver including a bias member that applies an ejection force to an authentication token while the authentication token is at a first position within the authentication token receiver. The system also includes a processor and a memory storing instructions that are executable by the processor. The instructions are executable by the processor to cause the processor to detect presence of the authentication token at the first position in the authentication token receiver. The instructions are also executable by the processor to cause the processor to prompt the user to input a user password in response to detecting the presence of the authentication token and while the authentication token is retained at the first position by an insertion force applied by a user. The instructions are executable by the processor to cause the processor to receive user input including the user password while the authentication token is retained at the first position by the insertion force applied by the user. The instructions are executable by the processor to cause the processor to read authentication data from a memory of the authentication token while the authentication token is retained at the first position by the insertion force applied by the user. The instructions are executable by the processor to cause the processor to determine whether the user is authenticated based on the authentication data.

The features, functions, and advantages that have been described can be achieved independently in various embodiments or may be combined in yet other embodiments, further details of which are disclosed with reference to the following description and drawings.

DETAILED DESCRIPTION

Figure 1:
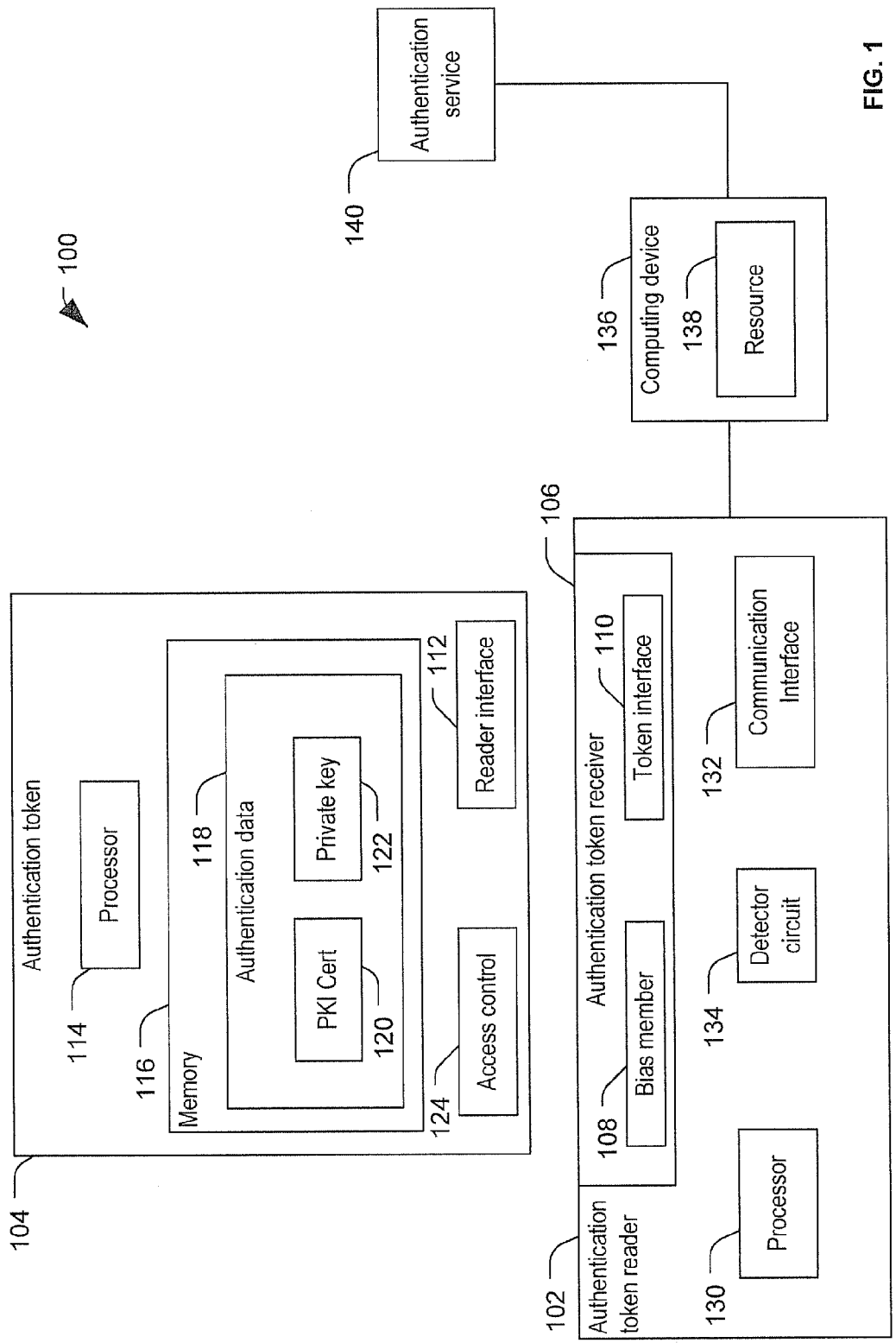
FIG. 1 is a block diagram of a particular embodiment of a user authentication system.

FIG. 1 is a block diagram of a particular embodiment of a user authentication system 100. The system 100 includes an authentication token 104 and an authentication token reader 102. The authentication token reader 102 may be coupled to or integral with a computing device 136. For example, the authentication token reader 102 may be coupled to the computing device 136 via a communication interface 132, such as a Universal Serial Bus (USB) connector, a Peripheral Component Interface (PCI) connector, or another connector. In a particular embodiment, the authentication token reader 102 is operable to facilitate authentication of a user before the computing device 136 enables the user to access particular resources of the computing device 136, such as the resource 138. The resource 138 may include a service or data that is provided via the computing device 136, such as a local application, an application that accesses local data, a remote application that is accessible via a network connection or other communication connection of the computing device 136, or remote data that is accessible via the computing device 136.

The authentication token 104 may include a reader interface 112 that enables the authentication token reader 102 to access data stored at a memory 116 of the authentication token 104. In a particular embodiment, the authentication token 104 is a "smart card" that includes authentication data 118 that is used to authenticate the user before the user is provided access to the resource 138. In other embodiments, the authentication token 104 may have a form factor other than a smart card form factor. For example, the authentication token 104 may be a fob or Personal Computer Memory Card International Association (PC) card device that includes the authentication data 118. The reader interface 112 may be a contact interface or a contactless interface. For example, the reader interface 112 may include one or more contact pads, connectors, pins or other physical components that are adapted to physically and/or electrically contact one or more contact pads, connectors, pins or other physical components of a token interface 110 of the authentication token reader 102. In another example, the reader interface 112 may include wireless communication components, such as a receiver, a transmitter, an antenna, or a combination thereof.

In a particular embodiment, the authentication token reader 102 includes an authentication token receiver 106 that is adapted to receive the authentication token 104. For example, the authentication token reader 102 may include one or more walls or other barriers that define a slot or opening in the authentication token reader 102. The slot or opening may define the authentication token receiver 106. The authentication token receiver 106 may include the token interface 110 and a bias member 108. The bias member 108 may be arranged to apply an ejection force to the authentication token 104 when the authentication token 104 is at a first position within the authentication token receiver 106. For example, when the authentication token 104 is inserted into the authentication token receiver 106 to a position that enables the token interface 110 to interact with the reader interface 112 (e.g., an operable position), the bias member 108 applies the ejection force. In order to maintain operable interaction between the token interface 110 and the reader interface 112, a user may apply an insertion force sufficient to overcome the ejection force; thereby retaining the authentication token 104 in the first position (i.e., the operable position) in the authentication token receiver 106.

In a particular embodiment, the authentication token receiver 106 does not have a retaining device to retain the authentication token 104 when the user ceases to apply the insertion force. Thus, when the user ceases to apply the insertion force (e.g., when the user lets go of the authentication token 104), the ejection force applied by the bias member 108 may cause the authentication token 104 to move to a second position relative to the authentication token receiver 106. In the second position, the authentication token 104 may be retained by the authentication token receiver 106, but the token interface 110 may not be able to interact with the reader interface 112. For example, the authentication token 104 may be retained by a slot that defines the authentication token receiver 106 such that the authentication token remains at least partially within the authentication receiver at the second position; however, contacts of the reader interface 112 may not align with and may be electrically isolated from contacts of the token interface 110. As another example, wireless communication between the token interface 110 and the reader interface 112 may not be operable when the authentication token 104 is at the second position.

In a particular embodiment, multi-factor authentication may be used to enable user access to the resource 138. For example, the authentication token 104 may include a processor 114 that controls access to the memory 116 based on access control data 124. To illustrate, the authentication data 118 may be encrypted or otherwise password protected in the memory 116. The processor 114 may decrypt or enable access to the authentication data 118 in response to receiving user input that corresponds to the access control data 124, such as a user password (e.g., a set of numbers, letters, or symbols, or a combination thereof). The authentication data 118 may then be read from the memory 116 to authenticate the user.

In some circumstances, a malicious entity may attempt to access the authentication token 104 via the computing device 136. For example, malicious software (also referred to as malware) executing at the computing device 136 may attempt to gain access to the memory 116 to insert malicious code or to gain access to the authentication data 118. In another example, a remote party, e.g., a "hacker", may attempt to access the authentication token 104 via a network connection to the computing device 136. One method to circumvent or avoid such malicious access attempts is to limit the amount of time that the authentication token 104 is readable or accessible via the authentication token reader 102. Thus, the authentication token reader 102 is provided with the bias member 108, which applies the ejection force to the authentication token 104 as long as the authentication token 104 is in a position that enables the authentication token reader 102 to access the memory 116 (e.g., as long as the token interface 110 can access or is aligned with the reader interface 112). In a particular example, the bias member 108 includes a spring (e.g., a bow spring) that is arranged to push the authentication token 104 away from the token interface 110 such that the reader interface 112 is not accessible by the token interface 110. Accordingly, in order for the authentication token reader 102 to read the authentication data 118 from the authentication token 104, the user must apply an insertion force to the authentication token 104 to overcome the ejection force applied by the bias member 108 to the authentication token 104.

In operation, when the user inserts the authentication token 104 into the authentication token receiver 106, a detector circuit 134 of the authentication token reader 102 may detect presence of the authentication token 104 at a first position in the authentication token receiver 106. For example, the detector circuit 134 may detect physical or electrical contact between the reader interface 112 and the token interface 110. In another example, the detector circuit 134 may wirelessly detect proximity of the reader interface 112 to the token interface 110. The first position may correspond to a fully inserted position at which the token interface 110 is able to access and interact with the reader interface 112 (e.g., an operative position). For example, the first position may be a position at which contacts of the reader interface 112 are aligned with and are in electrical contact with corresponding contacts of the token interface 110. In another example, the first position may be a position at which the token interface 110 is able to wirelessly communicate with the reader interface 112.

In response to detecting the presence of the authentication token 104 and while the authentication token 104 is retained at the first position by an insertion force applied by the user, the user may be prompted to input a user password. For example, a user interface display may be presented to the user via a display device coupled to the computing device 136. The user may input the password, which may be received by the computing device 136 and provided to the processor 130 of the authentication token reader 102, to the processor 114 of the authentication token 104, or to a processor of the computing device 136 to be compared to the access control data 124. Since the bias member 108 is applying the ejection force to the authentication token 104 as long as the authentication token 104 is at the first position, the user may retain the authentication token 104 at the first position by applying the insertion force while the user provides the user password.

When the user password is recognized (e.g., corresponds to or satisfies the access control data 124), the authentication data 118 can be read from the memory 116. When the user password is not recognized (e.g., does not correspond to or does not satisfy the access control data 124), the authentication data 118 is not readable (as unencrypted, plain text) from the memory 116. In a particular embodiment, the processor 114 of the authentication token 104 reads the authentication data 118 from the memory 116 when the user password is recognized. For example, in one particular multi-factor authentication scheme, the processor 114 of the authentication token 104 may read the PM certificate 120 and the private key 122 from the memory 116, may encrypt the PKI certificate 120 using the private key 122, and may provide the encrypted PKI certificate to the computing device 136 to authenticate the user. Since the bias member 108 is applying the ejection force to the authentication token 104 as long as the authentication token 104 is at the first position, the user may retain the authentication token 104 at the first position by applying the insertion force while the user password is checked using the access control data 124 and while the authentication data 118 is read. Additionally, when the particular multi-factor authentication scheme described above is used, the user may retain the authentication token 104 at the first position by applying the insertion force while the encrypted PKI certificate is generated and provided to the computing device 136.

The computing device 136, the authentication token reader 102, and/or the authentication token 104 may use the authentication data 118 read from the memory 116 of the authentication token 104 to determine whether the user is authenticated. For example, in the particular multi-factor authentication scheme described above, the encrypted PKI certification may be transmitted to an authentication service 140 that has access to a public key corresponding to the private key 122. The encrypted PKI certificate may be decrypted using the public key and the user may be authenticated based on the decrypted PKI certificate. Other verification processes may also be performed, either while the user applies the insertion force to retain the authentication token 104 at the first position or after the user ceases to apply the insertion force to the authentication token 104. For example, the memory 116 may include additional data (not shown), such as a shared key, that is used to receive and decrypt information sent from the authentication service 140 in order to establish a secure communication channel between the computing device 136 and the authentication service 140. In a particular embodiment, the authentication service 140 is local, i.e., is integral with the computing device 136 or the authentication token reader 102. In other embodiments, the authentication service 140 is remote and is accessible to the computing device 136 via a network communication connection.

After the user is authenticated, the user may cease to apply the insertion force to retain the authentication token 104 at the first position. When the user ceases to apply the insertion force, the authentication token 104 may be automatically moved by the ejection force applied by the bias member 108 to the second position (e.g., a non-operative position). At the second position, the authentication token reader 102 is not able to communicate with the authentication token 104. Thus, in the second position, data cannot be sent to the authentication token 104 by the authentication token reader 102 or the computing device 136, and data cannot be sent from the authentication token 104 to the authentication token reader 102 or the computing device 136. Furthermore, the authentication token reader 102 and the computing device 136 are not able to access the memory 116 of the authentication token 104 in the second position. Accordingly, in the second position, the authentication token 104 is isolated from malware attacks and unauthorized access attempts via the computing device 136.

Figure 2:
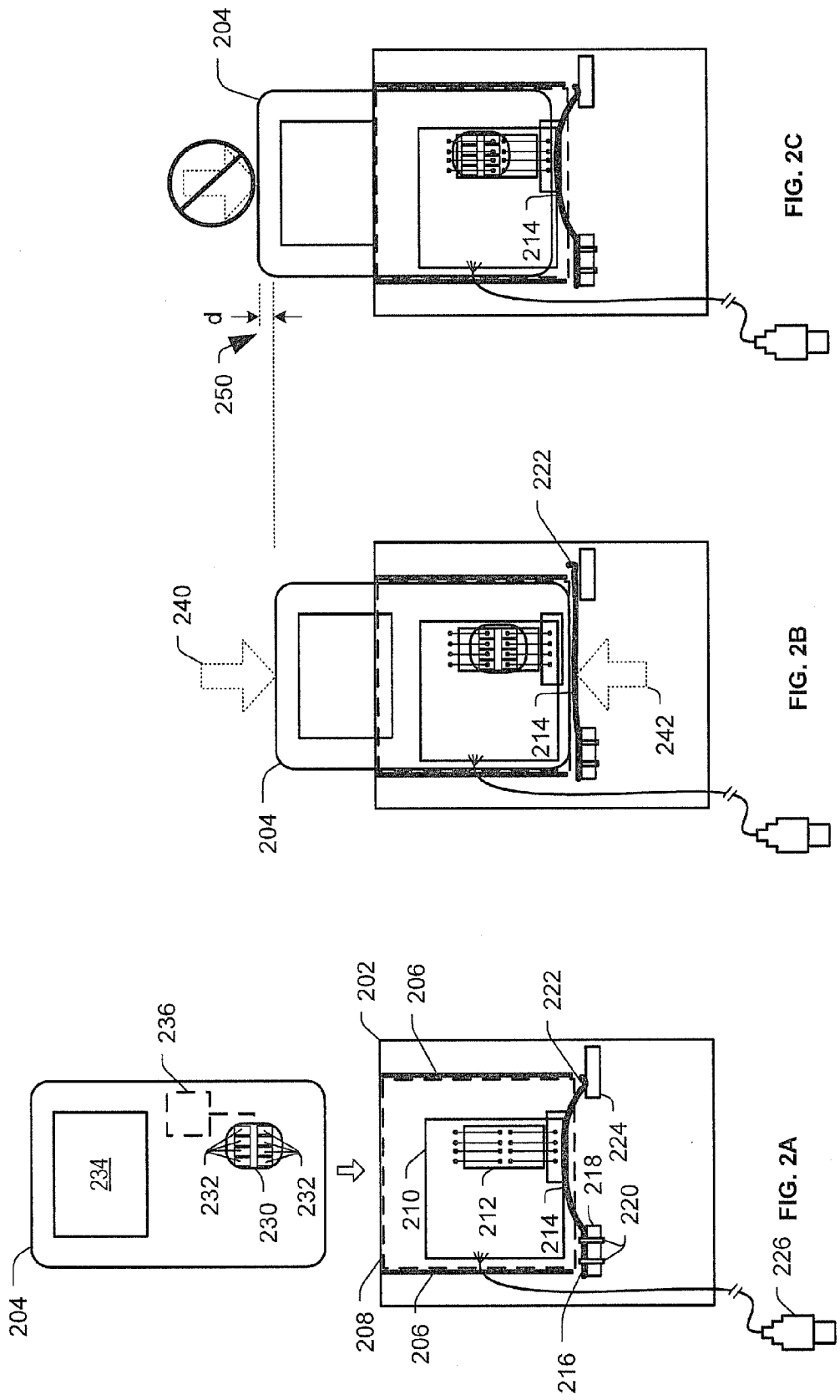
FIGS. 2A, 2B and 2C are stylized drawings of particular embodiments of an authentication token and an authentication token reader.

FIGS. 2A, 2B and 2C are stylized drawings of particular embodiments of an authentication token 204 and an authentication token reader 202. In FIGS. 2A-2C, one side of a case of the authentication token reader 202 has been omitted to enable viewing of internal components of the authentication token reader 202. In a particular embodiment, the authentication token 204 is the authentication token 104 of FIG. 1 and the authentication token reader 202 is the authentication token reader 102 of FIG. 1. For example, the authentication token reader 202 may be coupled to a computing device, such as the computing device 136 of FIG. 1, via a communication interface, such as a connector 226. FIGS. 2A-2C further illustrate physical and mechanical features of the authentication token 204 and the authentication token reader 202.

In FIGS. 2A-2C, the authentication token 204 is illustrated as a smart card; however, the authentication token 204 may have another form factor, such as a fob or a PC card form factor. Also, in FIGS. 2A-2C, a reader interface 230 of the authentication token 204 is illustrated as including contacts 232 that enable communication with a token interface 212 of the authentication token reader 202; however, in other embodiments the reader interface 230 may be contactless, and the reader interface 230 and the token interface 212 may communicate wirelessly. When the reader interface 230 is contactless, the contacts 232 and corresponding contacts of the token interface 212 may be replaced with wireless communication components, such as antennas.

In a particular embodiment, the authentication token 204 may include visual user identification information 234, such as a photograph of a user, a name of the user, or other access or identification credentials of the user. For example, the authentication token 204 may be a user identification badge or card. The authentication token 204 may also include one or more chips (e.g., integrated circuits) 236 that include memory and processing capability to enable storing authentication data and controlling access to the authentication data. For example, the chips 236 may include the processor 114, the memory 116 storing the authentication data 118 and the access control data 124 of FIG. 1.

The authentication token reader 202 may include an authentication token receiver 208 defined by walls 206 that form or define an opening or slot to receive the authentication token 204. The token interface 212 of the authentication token reader 202 may be disposed within the authentication token receiver 208 such that when the authentication token 204 is inserted into the authentication token receiver 208 to a first position, the contacts 232 of the reader interface 230 interact with (e.g., physically and/or electrically contact) the corresponding contacts of the token interface 212. The token interface 212 may be coupled to circuitry 210 that facilitates communication between the authentication token reader 202 and a computing device (not shown) via the connector 226 that facilitates communication between the authentication token 204 and the authentication token reader 202, that facilitates authentication of the user, or a combination thereof. For example, the circuitry 210 may include one or more of the processor 130, the detector circuit 134 and the communication interface 132 of FIG. 1.

A bias member, such as the bias member 108 of FIG. 1, may be disposed within the authentication token receiver 208. In a particular embodiment, the bias member is a bow spring 214. In other embodiments, another bias member or multiple bias members may be used, such as coil springs, torsion springs, cantilever springs, or compressible elastic members (e.g., foam or rubber elements). In the particular embodiment illustrated in FIGS. 2A-2C, a first end 216 of the bow spring 214 is anchored to a first support 218 using fasteners 220, and a second end 222 of the bow spring 214 is able to move (e.g., slide) along a second support 224. Movement along the second support 224 allows the bow spring 214 to defotm, as shown in FIG. 2B, from a neutral position, shown in FIG. 2A, when the authentication token 204 is inserted into the authentication token receiver 208 to the first position. The deformed bow spring 214 of FIG. 2B applies an ejection force 242 to the authentication token 204 when the authentication token 204 is at the first position (i.e., fully inserted into the authentication token receiver 208 as shown in FIG. 2B). The ejection force 242 may be overcome by an insertion force 240 applied by the user to retain the authentication token 204 in the authentication token receiver 208 at the first position.

When the user ceases to apply the insertion force 240, the ejection force 242 applied by the bow spring 214 causes the authentication token 204 to move to a second position. FIG. 2C illustrates an embodiment of the authentication token 204 at the second position. At the second position, the authentication token 204 is displaced from the first position by a distance, d, 250. The distance 250 may be sufficient that the token interface 212 of the authentication token reader 202 is not able to interact with the reader interface 230 of the authentication token 204. For example, the reader interface 230 may include the contacts 232 on a surface of the authentication token 204 and the authentication token reader 202 may include multiple corresponding contacts disposed within the authentication token receiver 208 at the token interface 212. In this example, when the authentication token 204 is at the first position (as shown in FIG. 2B), one or more of the multiple contacts 232 of the authentication token 204 align with one or more of the multiple corresponding contacts of the token interface 212. When the authentication token 204 is at the second position (as shown in FIG. 2C), one or more of the multiple contacts 232 of the authentication token 204 do not align with one or more corresponding contacts of the token interface 212. The distance 250 may be about 2 millimeters or more between the first position and the second position. In a particular embodiment, the authentication token 204 is retained by the authentication token receiver 208 in the second position (as shown in FIG. 2C).

In operation, the user may insert the authentication token 204 into the authentication token receiver 208 of the authentication token reader 202, as shown in FIG. 2A. The authentication token reader 202 may detect when the authentication token 204 has been inserted into the authentication token receiver 208 to the first position, as shown in FIG. 2B. For example, a detection circuit of the authentication token reader 202, such as the detector circuit 134 of FIG. 1, may detect electrical contact between the contacts 232 of the authentication token 204 and corresponding contacts of the token interface 212 of the authentication token reader 202. In another example, the detection circuit may detect proximity of the authentication token 204 to the authentication token reader 202 wirelessly.

In response to detecting presence of the authentication token 204 at the first position and while the authentication token 204 is retained at the first position by the insertion force 240 applied by the user, user input including a user password may be received. For example, the user may be prompted to input the user password while the user retains the authentication token 204 at the first position When the user password is received and recognized, authentication data may be read from a memory of the authentication token 204 while the authentication token 204 is retained at the first position by the insertion force 240. The user may be authenticated based on the authentication data. After the user is authenticated, the user may cease applying the insertion force 240, and the authentication token 204 may be moved to the second position, shown in FIG. 2C, by the ejection force 242 applied by the bow spring 214. Accordingly, after the user is authenticated, the authentication token 204 is automatically moved to a position that disables access to the memory of the authentication token 204, thereby protecting against unauthorized access to the memory and protecting against uploading of malicious content to the memory.

Figure 3:
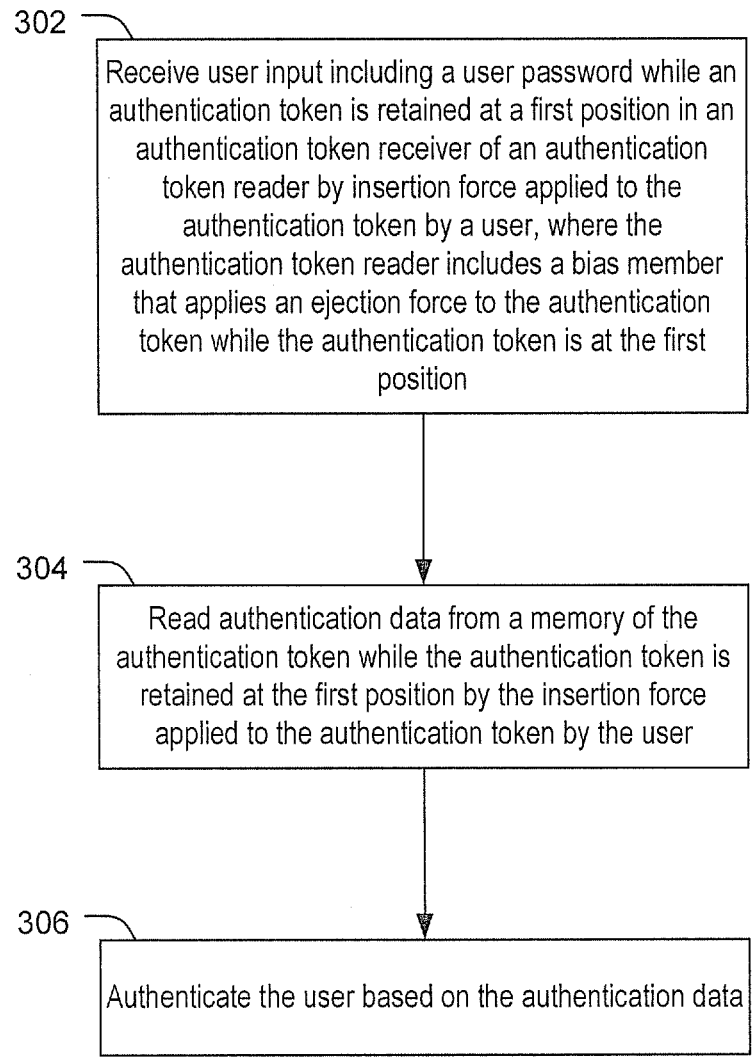
FIG. 3 is a flow diagram illustrating a first particular embodiment of a method of authenticating a user.

FIG. 3 is a flow diagram illustrating a first particular embodiment of a method of authenticating a user. The method of FIG. 3 may be performed by the authentication token 104 of FIG. 1 (e.g., using the processor 114), by the authentication token reader 102 of FIG. 1 (e.g., using the processor 130), by the computing device 136 of FIG. 1, or by a combination thereof. Additionally, or in the alternative, the method of FIG. 3 may be performed by the authentication token 204 of FIGS. 2A-2C (e.g., using software and/or hardware of the chips 236), by the authentication token reader 202 (e.g., using software and/or hardware of the circuitry 210), by a computing device (not shown) coupled to the authentication token reader 202 via the connector 226, or by a combination thereof.

As described with reference to FIGS. 1 and 2A-2C, an authentication token reader may include a bias member that applies an ejection force to an authentication token while the authentication token is at a first position that enables interaction between the authentication token and the authentication token reader. The method of FIG. 3 includes, at 302, receiving user input including a user password while the authentication token is retained at the first position in an authentication token receiver by an insertion force applied to the authentication token by a user. The method also includes, at 304, reading authentication data from a memory of the authentication token while the authentication token is retained at the first position by the insertion force applied to the authentication token by the user. The method further includes authenticating the user based on the authentication data. After the user is authenticated, the authentication token may be automatically ejected or partially ejected from the authentication token receiver to prevent malicious access to the authentication token.

Figure 4:
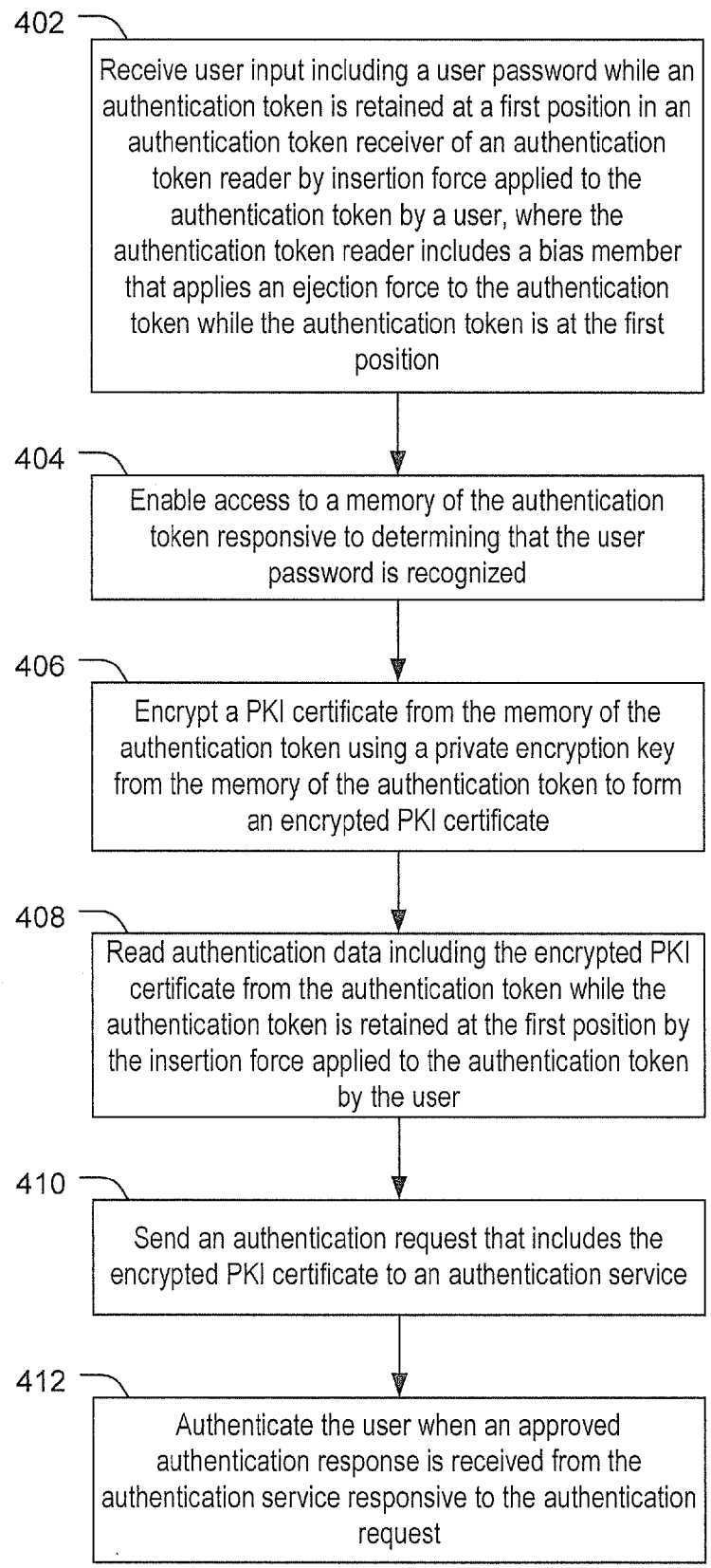
FIG. 4 is a flow diagram illustrating a second particular embodiment of a method of authenticating a user.

FIG. 4 is a flow diagram illustrating a second particular embodiment of a method of authenticating a user. The method of FIG. 4 may be performed by the authentication token 104 of FIG. 1 (e.g., using the processor 114), by the authentication token reader 102 of FIG. 1 (e.g., using the processor 130), by the computing device 136 of FIG. 1, or by a combination thereof. Additionally, or in the alternative, the method of FIG. 4 may be performed by the authentication token 204 of FIGS. 2A-2C (e.g., using software and/or hardware of the chips 236), by the authentication token reader 202 (e.g., using software and/or hardware of the circuitry 210), by a computing device (not shown) coupled to the authentication token reader 202 via the connector 226, or by a combination thereof.

As described with reference to FIGS. 1 and 2A-2C, an authentication token reader may include a bias member that applies an ejection force to an authentication token while the authentication token is at a first position that enables interaction between the authentication token and the authentication token reader. The method of FIG. 4 includes, at 402, receiving user input including a user password while the authentication token is retained at the first position in an authentication token receiver of the authentication token reader by an insertion force applied to the authentication token by a user. The method also includes, at 404, enabling access to a memory of the authentication token responsive to determining that the user password is recognized. The memory may store authentication data, such as a public key infrastructure (PKI) certificate, a private encryption key, other authentication data, or a combination thereof.

In a particular embodiment, the method includes, at 406, encrypting the PKI certificate using the private encryption key to form an encrypted PKI certificate. In a particular embodiment, to protect the PKI certificate and the private encryption key from unauthorized access, a processor of the authentication token may generate the encrypted PKI certification, and the method may include, at 408, reading authentication data including the encrypted PKI certificate from the authentication token while the authentication token is retained at the first position by the insertion force applied to the authentication token by the user.

The method may further include, at 410, sending an authentication request that includes the encrypted PKI certificate to an authentication service. For example, the authentication token 104, the authentication token 204, or the computing device 136 of FIG. 1 may send the authentication request to the authentication service 140. When an approved authentication response is received from the authentication service responsive to the authentication request, the user is authenticated.

After the user is authenticated, the authentication token may be automatically ejected or partially ejected from the authentication token receiver by the ejection force applied by the bias member. Thus, the authentication token is protected against malicious access, such as reading data from the memory of the authentication token or writing data or instructions to the authentication token.

Figure 5:
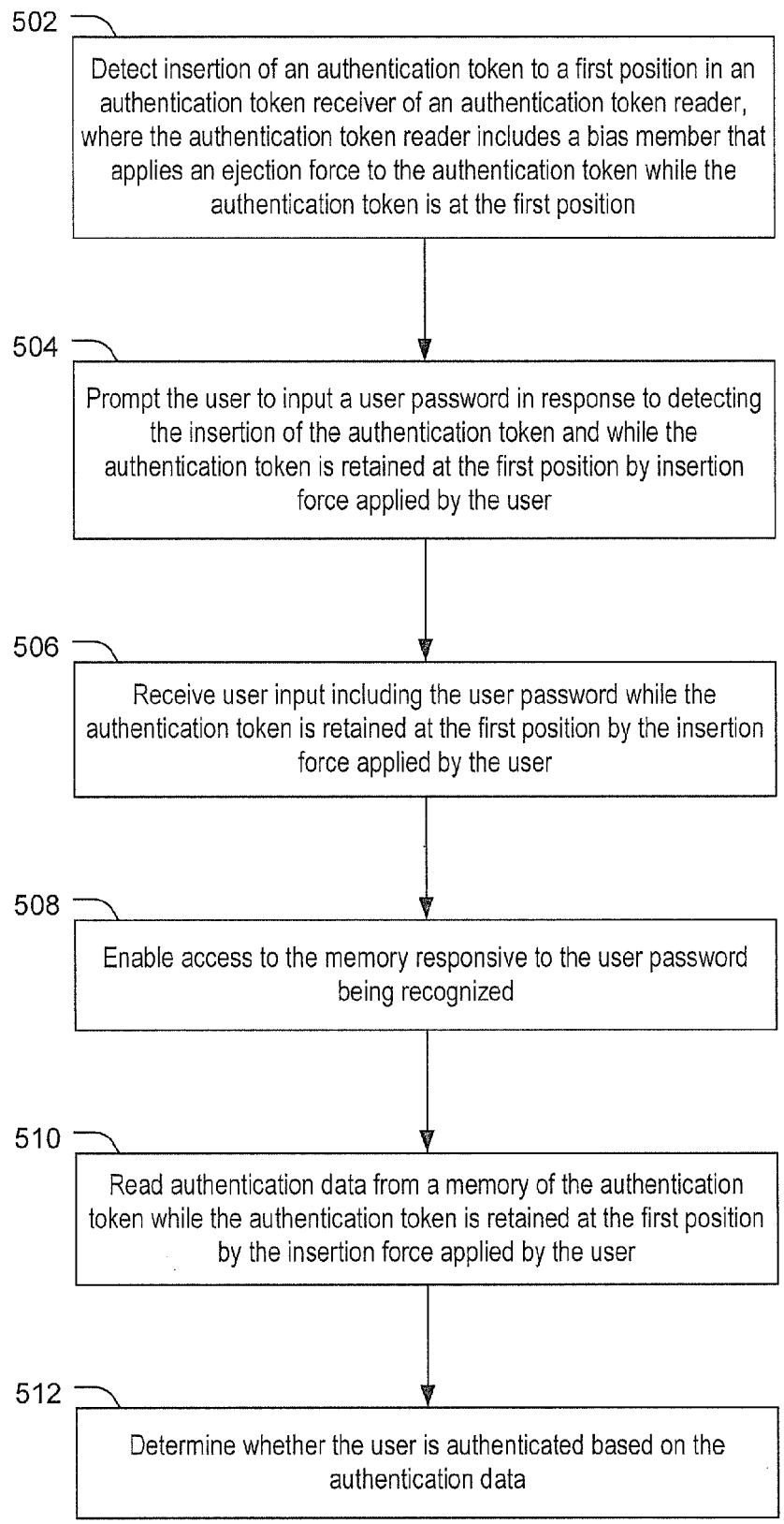
FIG. 5 is a flow diagram illustrating a third particular embodiment of a method of authenticating a user.

FIG. 5 is a flow diagram illustrating a third particular embodiment of a method of authenticating a user. The method of FIG. 5 may be performed by the authentication token 104 of FIG. 1 (e.g., using the processor 114), by the authentication token reader 102 of FIG. 1 (e.g., using the processor 130), by the computing device 136 of FIG. 1, or by a combination thereof. Additionally, or in the alternative, the method of FIG. 5 may be performed by the authentication token 204 of FIGS. 2A-2C (e.g., using software and/or hardware of the chips 236), by the authentication token reader 202 (e.g., using software and/or hardware of the circuitry 210), by a computing device (not shown) coupled to the authentication token reader 202 via the connector 226, or by a combination thereof.

As described with reference to FIGS. 1 and 2A-2C, an authentication token reader may include a bias member that applies an ejection force to an authentication token while the authentication token is at a first position that enables interaction between the authentication token and the authentication token reader. The method of FIG. 5 includes, at 502, detecting insertion of the authentication token to the first position in an authentication token receiver of the authentication token reader. For example, the detector circuit 134 of FIG. 1, the token interface 110 or the reader interface 112, or a combination thereof, may be used to detect insertion of the authentication token.

The method may also include, at 504, prompting the user to input a user password in response to detecting the insertion of the authentication token and while the authentication token is retained at the first position by an insertion force applied by the user. For example, a user interface may be displayed at a computing device coupled to the authentication token reader. The user interface may prompt the user to input the user password. The method may also include, at 506, receiving user input including the user password while the authentication token is retained at the first position by the insertion force applied by the user. For example, the user may input the user password via the user interface displayed at the computing device coupled to the authentication token reader.

The method may include, at 508, enabling access to the memory responsive to the user password being recognized. For example, the user password may be compared to access control data, such as the access control data 124 of FIG. 1, to determine whether the user password is recognized. When the user password is recognized, the authentication token reader may be granted access to the memory of the authentication token. The method may further include, at 510, reading authentication data from the memory of the authentication token while the authentication token is retained at the first position by the insertion force applied by the user. For example, a processor of the authentication token, a processor of the authentication token reader, or a processor of a computing device coupled to the authentication token reader may read the authentication data. The method may include, at 512, determining whether the user is authenticated based on the authentication data. For example, an authentication request based on the authentication data may be sent to an authentication service. The authentication service may send an authentication response in response to the authentication request. The authentication response may indicate whether the user is authenticated or not.

After the user is authenticated, the authentication token may be automatically ejected or partially ejected from the authentication token receiver by the ejection force applied by the bias member. Thus, after the user releases the authentication token, the authentication token is protected against malicious access, such as reading data from the memory of the authentication token or writing data or instructions to the authentication token.

Figure 6:
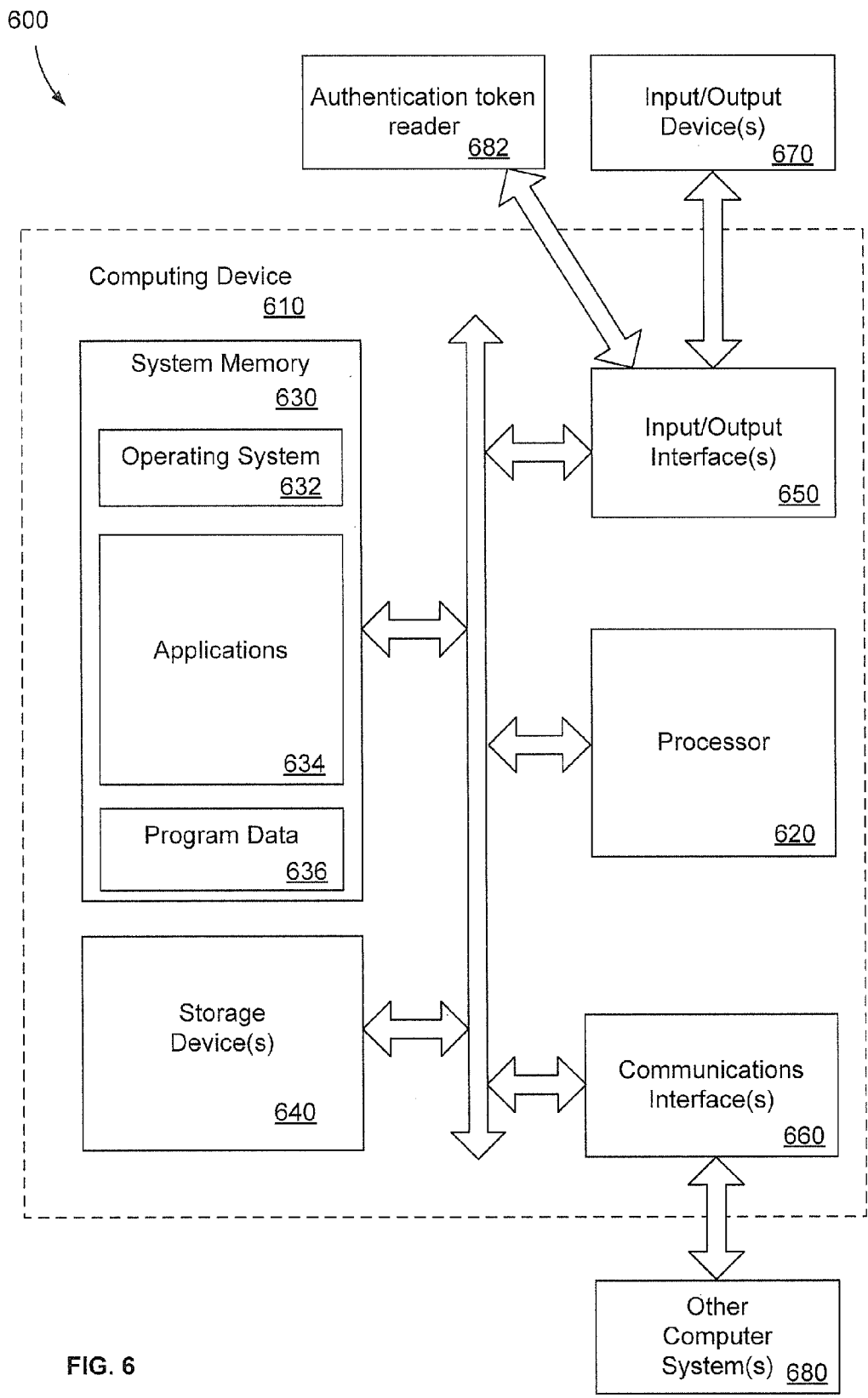
FIG. 6 is a block diagram of a particular embodiment of a computing environment in which a user may be authenticated.

FIG. 6 is a block diagram of a particular embodiment of a computing environment 600 that is operable to authenticate a user. The computing environment 600 includes a computing device 610 operable to support embodiments of computer-implemented methods and computer-executable program instructions (or code) according to the present disclosure. For example, the computing device 610, or a portion thereof, is operable to facilitate authentication of a user. For example, the computing device 610, or portions thereof, may include or be included within the computing device 136 of FIG. 1, the authentication token reader 102 of FIG. 1, the authentication token 104 of FIG. 1, the authentication token reader 202 of FIGS. 2A-2C, the authentication token 204 of FIGS. 2A-2C, or a combination thereof.

The computing device 610 may include at least one processor 620. Within the computing device 610, the at least one processor 620 may communicate with a system memory 630, one or more storage devices 640, one or more input/output interfaces 650, one or more communications interfaces 660, or a combination thereof.

The system memory 630 may include volatile memory devices (e.g., random access memory (RAM) devices), non-volatile memory devices (e.g., read-only memory (ROM) devices, programmable read-only memory, and flash memory), or both. The system memory 630 may include an operating system 632, which may include a basic/input output system for booting the computing device 610 as well as a full operating system to enable the computing device 610 to interact with users, other programs, and other devices. The system memory 630 also typically includes one or more application programs 634. The system memory 630 also may include program data 636 that is related, used by, or generated by the application programs 634.

The processor 620 may also communicate with one or more storage devices 640. For example, the one or more storage devices 640 may include nonvolatile storage devices, such as magnetic disks, optical disks, or flash memory devices. The storage devices 640 may include both removable and non-removable memory devices. The storage devices 640 may be configured to store an operating system, applications and program data. In a particular embodiment, the system memory 630, the storage devices 640, or both, include tangible, non-transitory computer-readable media.

The processor 620 may also communicate with one or more input/output interfaces 650 that enable the computing device 610 to communicate with one or more input/output devices 670 to facilitate user interaction. The input/output interfaces 650 may include serial interfaces (e.g., universal serial bus (USB) interfaces or IEEE 1394 interfaces), parallel interfaces, display adapters, audio adapters, and other interfaces. The input/output devices 670 may include keyboards, pointing devices, displays, speakers, microphones, touch screens, and other devices. For example, the computing device 610 may receive a user password via one of the input/output devices 670 while a user applies an insertion force to an authentication token to retain the authentication token in an operable position relative to an authentication token reader 682.

The processor 620 may communicate with other computer systems 680 via the one or more communications interfaces 660. The one or more communications interfaces 660 may include wired Ethernet interfaces, IEEE 802 wireless interfaces, Bluetooth communication interfaces, or other network interfaces. The other computer systems 680 may include host computers, servers, workstations, and other computing devices, such as a server that provides an authentication service.

Thus, in particular embodiments disclosed herein, resources of the computing device 610, such as the operating system 632, the applications 634, the program data 636 or access to the other computer systems 680 via the communications interfaces 660, may be made available to authenticated users. The users may have authentication tokens that store authentication data. The authentication data may be accessible when a user inserts his or her authentication token to an operative position relative to the authentication token reader 682 and holds the authentication token in the operative position during an authentication process, e.g., while entering a user password and while the authentication data is read from the authentication token. The authentication token and the authentication data are protected from malicious access by automatically ejecting the authentication token from the operative position when the user releases the authentication token.

Embodiments described above illustrate but do not limit the disclosure. It should also be understood that numerous modifications and variations are possible in accordance with the principles of the present disclosure. Accordingly, the scope of the disclosure is defined only by the following claims.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. In another example, certain components or features of a system may be optional. To illustrate, when the computing device 610 is an authentication token, certain components of the computing device 610 may not be present, such as the communications interface 660 that enables network communication. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A method comprising:
  receiving user input including a user password while an authentication token is retained at a first position in an authentication token receiver of an authentication token reader by an insertion force applied to the authentication token by a user, wherein the authentication token reader includes a bias member configured to apply an ejection force to the authentication token while the authentication token is at the first position;
  reading authentication data from a memory of the authentication token while the authentication token is retained at the first position by the insertion force applied to the authentication token by the user, wherein if the user ceases to apply the insertion force prior to completion of reading the authentication data, the ejection force moves the authentication token from the first position to a different position without the user being authenticated; and
  authenticating the user based on the authentication data if the user continuously applied the insertion force during reading of the authentication data.

2. The method of claim 1, wherein the authentication token is moved to a second position by the ejection force when the user releases the authentication token.

3. The method of claim 2, wherein the second position is approximately 2 mm from the first position.

4. The method of claim 2, wherein the authentication token remains at least partially within the authentication token receiver when the authentication token is in the second position.

5. The method of claim 1, wherein the authentication data is read from the memory of the authentication token by accessing the memory via a reader interface of the authentication token while the authentication token is retained at the first position by the insertion force applied to the authentication token by the user.

6. The method of claim 5, wherein the authentication token is moved to a second position by the ejection force when the user releases the authentication token, and wherein the authentication token reader is not able to access the memory when the authentication token is at the second position.

7. The method of claim 6, wherein the reader interface comprises multiple electrical contacts and wherein the authentication token reader comprises multiple corresponding contacts disposed within the authentication token receiver, wherein, when the authentication token is at the first position, one or more of the multiple contacts of the authentication token align with one or more of the multiple corresponding contacts of the authentication token reader, and wherein, when the authentication token is at the second position, the one or more of the multiple contacts of the authentication token do not align with the one or more of the multiple corresponding contacts of the authentication token reader.

8. The method of claim 1, wherein the bias member is a bow spring.

9. The method of claim 1, wherein the authentication token is a user identification card that includes visual user identification information and the authentication token receiver is defined by walls of the authentication token reader that form an opening to receive the user identification card.

10. The method of claim 1, wherein the authentication data includes a private encryption key and a public key infrastructure (PKI) certificate.

11. The method of claim 10, further comprising:
enabling access to the memory responsive to determining that the user password is recognized;
encrypting the PKI certificate using the private encryption key to form an encrypted PKI certificate; and
sending an authentication request that includes the encrypted PKI certificate to an authentication service, wherein the user is authenticated when an approved authentication response is received from the authentication service responsive to the authentication request.

12. A method comprising:
detecting insertion of an authentication token to a first position in an authentication token receiver of an authentication token reader, wherein the authentication token reader includes a bias member configured to apply an ejection force to the authentication token while the authentication token is at the first position;
in response to detecting the insertion of the authentication token and while the authentication token is retained at the first position by an insertion force applied by a user, prompting the user to input a user password;
while the authentication token is retained at the first position by the insertion force applied by the user, receiving user input including the user password;
while the authentication token is retained at the first position by the insertion force applied by the user, reading authentication data from a memory of the authentication token, wherein if the user ceases to apply the insertion force prior to completion of reading the authentication data, the ejection force moves the authentication token from the first position to a different position without the user being authenticated; and
determining whether the user is authenticated based on the authentication data if the user continuously applied the insertion force during reading of the authentication data.

13. The method of claim 12, further comprising enabling access to the memory responsive to the user password being recognized.

14. The method of claim 12, wherein the authentication token reader is coupled to a computing device, and further comprising enabling access to one or more resources of the computing device in response to determining that the user is authenticated.

15. The method of claim 14, wherein the computing device is not able to access the memory of the authentication token after the user ceases to apply the insertion force to the authentication token.

16. A system comprising:
an authentication token receiver including a bias member configured to apply that applies an ejection force to an authentication token while the authentication token is at a first position within the authentication token receiver;
a processor; and
memory storing instructions that are executable by the processor to cause the processor to:
detect presence of the authentication token at the first position in the authentication token receiver;
in response to detecting the presence of the authentication token and while the authentication token is retained at the first position by an insertion force applied by a user, prompt the user to input a user password;
while the authentication token is retained at the first position by the insertion force applied by the user, receive user input including the user password;
while the authentication token is retained at the first position by the insertion force applied by the user, read authentication data from a memory of the authentication token, wherein if the user ceases to apply the insertion force prior to completion of reading the authentication data, the ejection force moves the authentication token from the first position to a different position without the user being authenticated; and
determine whether the user is authenticated based on the authentication data if the user continuously applied the insertion force during reading of the authentication data.

17. The system of claim 16, wherein the bias member is a spring.

18. The system of claim 16, wherein the presence of the authentication token is detected by detecting proximity of the authentication token to a detector circuit of the authentication token receiver.

19. The system of claim 16, wherein the presence of the authentication token is detected by electrical contact between contacts of the authentication token and corresponding contacts of a detector circuit of the authentication token receiver.

20. The system of claim 16, further comprising a communication interface from the authentication token receiver to an external computing device.

* * * * *